No. 875,816. PATENTED JAN. 7, 1908.
G. A. HOLMES.
SNAP FASTENER.
APPLICATION FILED MAY 7, 1906.

Witnesses:
L. S. Cassey.
F. H. Bliss.

Inventor:
George A. Holmes
by Donald Campbell
his Attorney

UNITED STATES PATENT OFFICE.

GEORGE A. HOLMES, OF NEWTON CENTER, MASSACHUSETTS, ASSIGNOR TO UNITED STATES FASTENER COMPANY, OF BOSTON, MASSACHUSETTS, A CORPORATION OF MAINE.

SNAP-FASTENER.

No. 875,816.      Specification of Letters Patent.      Patented Jan. 7, 1908.

Application filed May 7, 1906. Serial No. 315,551.

*To all whom it may concern:*

Be it known that I, GEORGE A. HOLMES, a citizen of the United States, and resident of Newton Center, Massachusetts, have invented a new and useful Improvement in Snap-Fasteners, of which the following, taken in connection with the accompanying drawings, is a specification.

My invention relates to fasteners, and more particularly to separable fasteners especially of the class which has now become widely known as snap fasteners.

The improvements relate to the novel fastener hereinafter to be described as an entirety, and also to certain novel features therein which increase the range of availability and efficiency of this class of article; and also to the specific means by which such features are provided.

I will first describe a fastener embodying my improvements and then point out the novel features in the claims.

Figure 1:
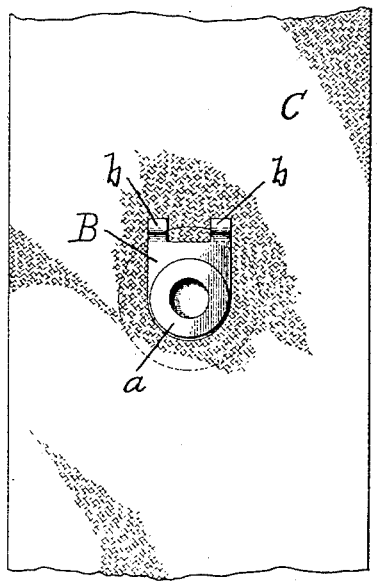
Figures 2, 3:
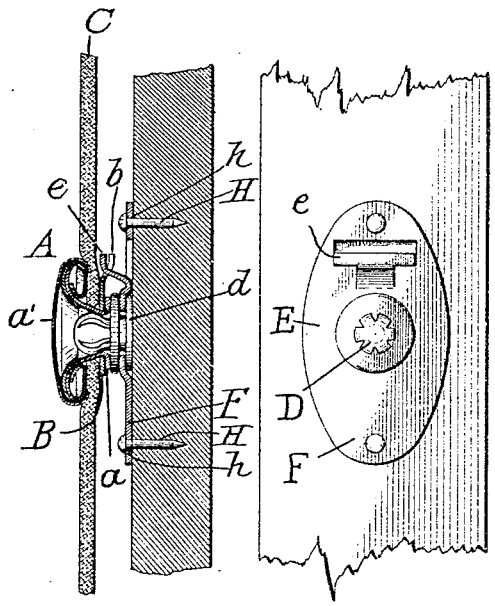

In the accompanying drawings forming part of this specification, Figure 1 is a face view of a piece of fabric to which is secured one of the separable members of a fastener embodying my invention. Fig. 2 represents a complementary member adapted to be engaged with the member shown in Fig. 1; the member shown in Fig. 2 being attached by nails or rivets to woodwork or the like. Fig. 3 shows a central cross-section of a fastener comprising the members shown in Figs. 1 and 2 respectively engaged with each other.

Similar letters of reference designate corresponding parts in the several figures of the drawings.

In fasteners of the class known as snap fasteners there is usually provided a socket member and as well a ball or stud member, the latter having an enlarged head which is sprung into and out of the contracted mouth of the socket member. Generally speaking this kind of device was old.

The present improvements relate more particularly to the addition of features which render separable fasteners self-locking; and other features as will hereinafter appear.

A represents a socket member the details of which need not be described any further than to state that it comprises a head $a'$ built up of several pieces of sheet metal, and an attaching eyelet $a$ which, as usual in such cases, is passed through a perforation in the fabric and clenched within the head $a'$ as best seen in Fig. 3.

The particular socket member which is shown in the figures is one having a lock plate B. This lock plate is one which I prefer to provide as a separate sheet metal piece having an aperture permitting it to be located over the neck of the attaching eyelet in the process of attachment of the socket to the fabric or material C. This locking plate B is one having an offset or projection the purpose of which is to engage a complementary offset or projection connected with the ball or stud member. The offset or projection of the locking plate B consists of a pair of claws $b$.

The stud or ball member D may be of any preferred type, for example, of the bird-cage spring variety. As is the case with the socket member, the ball member D has a locking plate E with an offset or projection $e$. This offset $e$ is preferably T-shaped and in the form of a straight bar struck out of the sheet metal of the plate E which is the best form for engaging the duplicate locking claws $b$ on the other member of the fastener.

The locking plate E like the locking plate B is preferably formed with an aperature which slips over the attaching eyelet $d$ of the ball D, which latter is thereby secured to the plate E.

As this form of fastener is especially useful for securing curtains, carpets or the like where one of the parts is to be secured to woodwork or metal as distinguished from fabric, I have provided on one or the other of the parts an attaching plate. This is preferably combined with the stud D and also for convenience I form it out of the same piece of metal as the locking plate E. The attaching portions of this plate are designated by F, and they have nail or rivet holes $h$ by which the plate, and thereby the stud or ball member may, through nails H or the like, be secured to woodwork or the like.

The active engagement of the ball and socket members will be substantially as follows: The socket member will be held in such relation to the other member that the claws $b$ may be inserted under the bar $e$ and then the socket member swung over the locking device as a sort of hinge until it arrives at the point where a slight additional movement will cause its engagement with the stud. As thus engaged the socket member may not be disengaged save by a pull on the side opposite to the locking devices.

What I claim and desire to secure by Letters Patent is:

1. A snap fastener comprising a socket member and a ball member and a pair of locking plates secured respectively to the socket and ball members, said locking plates having offset locking projections at one side adapted to become engaged with each other in the act of engaging said socket and ball members; the said locking plates having apertures fitted around the socket and ball members respectively.

2. A snap fastener comprising socket and ball members, one of said members having a locking plate comprising an offset T-shaped part, and the other member having a locking plate comprising an offset pair of claws adapted to straddle and interlock with said offset T-shaped part in the act of engaging said socket and ball members.

In testimony whereof, I have signed my name to this specification in the presence of two subscribing witnesses, on this fourth day of May A. D., 1906.

GEORGE A. HOLMES.

Witnesses:
 FRED JOY,
 L. S. CASSEY.